United States Patent
Quan et al.

(10) Patent No.: US 8,120,658 B2
(45) Date of Patent: Feb. 21, 2012

(54) HAND JITTER REDUCTION SYSTEM FOR CAMERAS

(75) Inventors: Shuxue Quan, San Diego, CA (US); Chinchuan Andrew Chiu, San Diego, CA (US); Xiaoyun Jiang, San Diego, CA (US); Jingqiang Li, San Diego, CA (US); Ying Xie Noyes, San Diego, CA (US); Kalin Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 11/534,993

(22) Filed: Sep. 25, 2006

(65) Prior Publication Data

US 2007/0166020 A1 Jul. 19, 2007

Related U.S. Application Data

(60) Provisional application No. 60/760,768, filed on Jan. 19, 2006.

(51) Int. Cl.
*H04N 5/228* (2006.01)
*G03B 17/00* (2006.01)

(52) U.S. Cl. ......... 348/208.12; 348/208.99; 348/208.13; 396/55

(58) Field of Classification Search ............. 348/208.12, 348/208.13, 208.99, 229.1
See application file for complete search history.

(56) References Cited

U.S. PATENT DOCUMENTS

| | | | |
|---|---|---|---|
| 4,446,521 A | 5/1984 | Inouye | |
| 4,845,766 A | 7/1989 | Peppers et al. | |
| 4,922,543 A | 5/1990 | Ahlbom et al. | |
| 5,018,216 A | 5/1991 | Kojima | |
| 5,262,856 A | 11/1993 | Lippman et al. | |
| 5,745,808 A * | 4/1998 | Tintera | 396/236 |
| 5,821,943 A | 10/1998 | Shashua | |

(Continued)

FOREIGN PATENT DOCUMENTS

JP 11215432 A 8/1999

(Continued)

OTHER PUBLICATIONS

Sung Cheol Park, et al., Super-Resolution Image Reconstruction: IEEE Signal Processing Magazine (May 2003).

(Continued)

*Primary Examiner* — Lin Ye
*Assistant Examiner* — Mekonnen Dagnew
(74) *Attorney, Agent, or Firm* — George Pappas; Espartaco Diaz Hidalgo (57) ABSTRACT

A camera system in normal mode and hand jitter reduction (hjr) mode may comprise generating a first exposure time-gain product by multiplying the normal mode exposure time with the normal mode gain. It may further comprise modifying the normal mode exposure time and gain and multiplying these modified parameters to generate a second exposure time-gain product for a hjr mode that reduces the difference between the first exposure time-gain product and the second exposure time-gain product. To reduce the difference the normal mode frame rate may also be modified. Operation of a camera in normal mode may be in response to a sensed light level being above a threshold. The hjr mode may be selected by the user while the camera is operating. The hjr mode may be used in response to a sensed light level being lower than the threshold.

33 Claims, 8 Drawing Sheets

U.S. PATENT DOCUMENTS

| | | | |
|---|---|---|---|
| 5,832,101 A | 11/1998 | Hwang et al. | |
| 5,832,110 A | 11/1998 | Hull | |
| 5,943,450 A | 8/1999 | Hwang | |
| 6,005,981 A | 12/1999 | Ng et al. | |
| 6,128,047 A | 10/2000 | Chang et al. | |
| 6,160,900 A | 12/2000 | Miyawaki et al. | |
| 6,166,370 A | 12/2000 | Sayag | |
| 6,243,419 B1 | 6/2001 | Satou et al. | |
| 6,285,711 B1 | 9/2001 | Ratakonda et al. | |
| 6,310,985 B1 | 10/2001 | White | |
| 6,381,279 B1 | 4/2002 | Taubman | |
| 6,418,168 B1 | 7/2002 | Narita | |
| 6,434,265 B1 | 8/2002 | Xiong et al. | |
| 6,522,712 B1 | 2/2003 | Yavuz et al. | |
| 6,693,673 B1 | 2/2004 | Tanaka et al. | |
| 6,750,903 B1 | 6/2004 | Miyatake et al. | |
| 6,873,360 B1 * | 3/2005 | Kawashiri | 348/296 |
| 6,879,656 B2 | 4/2005 | Cesmeli et al. | |
| 6,996,176 B1 | 2/2006 | Chang et al. | |
| 6,996,254 B2 | 2/2006 | Zhang et al. | |
| 7,057,645 B1 | 6/2006 | Hara et al. | |
| 7,065,261 B1 | 6/2006 | Horie | |
| 7,414,648 B2 * | 8/2008 | Imada | 348/208.12 |
| 7,555,166 B2 | 6/2009 | Lee et al. | |
| 7,672,503 B2 | 3/2010 | Morisada et al. | |
| 2001/0033693 A1 | 10/2001 | Seol et al. | |
| 2002/0097904 A1 | 7/2002 | White | |
| 2002/0164075 A1 | 11/2002 | Acharya et al. | |
| 2003/0223010 A1 * | 12/2003 | Kaplinsky et al. | 348/362 |
| 2004/0056966 A1 * | 3/2004 | Schechner et al. | 348/229.1 |
| 2004/0114831 A1 | 6/2004 | Notovitz et al. | |
| 2004/0145673 A1 | 7/2004 | Washisu | |
| 2004/0160525 A1 * | 8/2004 | Kingetsu et al. | 348/364 |
| 2004/0170246 A1 | 9/2004 | Koenig et al. | |
| 2004/0239775 A1 | 12/2004 | Washisu | |
| 2005/0036558 A1 * | 2/2005 | Dumitras et al. | 375/240.29 |
| 2005/0056699 A1 * | 3/2005 | Meier et al. | 235/454 |
| 2005/0094901 A1 | 5/2005 | Seol et al. | |
| 2005/0166054 A1 | 7/2005 | Fujimoto | |
| 2005/0195221 A1 | 9/2005 | Berger et al. | |
| 2005/0232494 A1 | 10/2005 | Fan | |
| 2006/0274156 A1 | 12/2006 | Rabbani et al. | |
| 2007/0076982 A1 | 4/2007 | Petrescu | |
| 2007/0171981 A1 | 7/2007 | Qi | |
| 2007/0172150 A1 | 7/2007 | Quan et al. | |
| 2007/0236579 A1 | 10/2007 | Li et al. | |
| 2007/0237514 A1 | 10/2007 | Pillman et al. | |
| 2008/0165280 A1 | 7/2008 | Deever et al. | |
| 2008/0292171 A1 | 11/2008 | Bruder et al. | |
| 2009/0123082 A1 | 5/2009 | Atanssov et al. | |
| 2010/0171837 A1 | 7/2010 | Pillman et al. | |

FOREIGN PATENT DOCUMENTS

| | | |
|---|---|---|
| JP | 2000047297 | 2/2000 |
| JP | 2000-224470 A | 8/2000 |
| JP | 2003322906 A | 11/2003 |
| JP | 2004072422 A | 3/2004 |
| JP | 2004304252 A | 10/2004 |
| JP | 2004357202 | 12/2004 |
| JP | 2005286790 A | 10/2005 |
| JP | 2006086762 A | 3/2006 |
| WO | WO8603866 | 7/1986 |

OTHER PUBLICATIONS

Ben-Ezra, et al., Motion Deblurring Using Hybrid Imaging: IEEE Computer Society Conference on Computer Vision and Pattern Recognition (CVPR '03).

Xing Yu Qi, et al., Motion Deblurring for Optical Character Recognition: IEEE Computer Society Conference on Computer Vision and Pattern Recognition (ICDAR '05).

Moshe Ben-Ezra, et al., Motion-Based Motion Deblurring: IEEE Transactions on Pattern Analysis and Machine Intelligence, vol. 26 No. 6 (Jun. 2004).

International Search Report, PCT/US2007/060809, Jul. 30, 2007.

Cain, S. et al.: "Projection-Based Image Registration in the Presence of Fixed-Pattern Noise," IEEE Transactions on Image Processing, vol. 10, No. 12, pp. 1860-1861, (Dec. 2001), XP011025877, ISSN: 1057-7149.

Huafu, C. et. al., "A Projection-Based Image Registration Algorithm and Its Application", Brain-Topography, Klumer Academic Publishers-Plenum Publishers, NE, vol. 18, np. 1, Sep. 1, 2005, pp. 47-58, XP 0154274484, ISSN: 1573-6792.

Joon-Seek, K. et. al.: "A Fast Feature-Based Block Matching Algorithm Using Integral Projections" IEEE Journal on Selected Areas in Communications, IEEE Service Center, Piscataway, US, vol. 10, No. 5, Jun. 1, 1992, pp. 968-971, XP000276102 ISSN: 0733-8716.

Sauer, K. et. al.: "Efficient Block Motion Estimation Using Integral Projections" IEEE Transactions on Circuits and Systems for Video Technology, IEEE Service Center, Piscataway, NJ, US, vol. 6, No. 5, Oct. 1, 1996, XP011014326 ISSN: 1051-8215, pp. 513-518.

Written Opinion—PCT/US2007/60809, International Search Authority, European Patent Office, Mar. 25, 2009.

Cain, Stephen "Projection-Based Image Registration in the presence of Fixed-Pattern Noise", Dec. 2001, IEEE Transactions on Image Processing, vol. 10 No. 12 p. 1860-1872.

* cited by examiner

HAND JITTER REDUCTION SYSTEM FOR CAMERAS

CROSS-RELATED APPLICATIONS

This application claims the benefit of provisional U.S. Application Ser. No. 60/760,768, entitled "HAND JITTER REDUCTION SYSTEM DESIGN," filed Jan. 19, 2006. This disclosure is related to co-pending patent application Ser. No. 11/534,935 entitled "HAND JITTER REDUCTION COMPENSATING FOR ROTATIONAL MOTION," and co-pending patent application Ser. No. 11/534,808 entitled "HAND JITTER REDUCTION FOR COMPENSATING FOR LINEAR DISPLACEMENT," both co-filed with this application on Sep. 25, 2006.

TECHNICAL FIELD

This disclosure relates to digital picture processing and, more particularly, to a hand jitter reduction system for cameras.

BACKGROUND

The demand for multimedia applications in mobile communications has been growing at an astounding rate. Today, a user can send and receive still images, as well as download images and video from the Internet, for viewing on a mobile unit or handset. The integration of the digital camera into the mobile unit has further contributed to the growing trend in mobile communications for multimedia functionality.

Given the limited amount of resources like battery capacity, processing power, and transmission speed associated with a mobile unit, effective digital imaging processing techniques are needed to support multimedia functions. This requires the development of more sophisticated hardware and software that reduces computational complexity for multimedia applications while maintaining the image quality. The development of such hardware and software leads to lower power consumption and longer standby time for the mobile unit.

One facet of the digital imaging process involves removing blurriness from a picture. Blurriness may be caused by hand jitter. Hand jitter is caused by the movement of the user's hand when taking a digital picture with a camera. Even if the user is unaware of the movement, the hand may be continually moving. The movements are relatively small, but if the movements are large relative to the exposure time, the digital picture may be blurry. An object or person in the picture may appear to be moving. Blurriness may also be caused by an object/person moving when a picture is being taken. Blurriness may also be caused by limitations of the optical system used to capture the pictures.

Under low lighting conditions, a digital camera, for example, one found in a mobile unit, takes a longer time to register a picture. The longer exposure time increases the probability that the slight movements produced by the hand may lead to blurriness. Similarly, the longer exposure time increases the chance that the movement by the object/person may be large relative to the exposure time.

Current techniques for compensating for camera movements involve the use of small gyroscopes or other mechanical devices. None of the techniques seem to have an acceptable way to digitally compensate for the camera movements, especially under low lighting conditions. It would be desirable to reduce the amount of blurriness in a digital picture with efficient processing resources suitable for mobile applications under all conditions.

SUMMARY

The details of one or more configurations are set forth in the accompanying drawings and the description below. Other features, objects, and advantages will be apparent from the description, drawings and claims.

A camera system comprising a hand jitter reduction (hjr) reduction mode and normal mode may operate by multiplying an exposure time and a gain to generate an exposure time-gain product. There may be a normal mode exposure time-gain product and an hjr mode exposure time-gain product. The exposure time-gain product in normal mode of the normal exposure time and normal gain may be stored in table or used as needed. The exposure time-gain product in hjr mode, may be also stored in a table. The exposure time-gain product in hjr mode, may be produced by modifying (adding, subtracting, multiplying, or dividing) entries in the exposure time-product table (or entry) in normal mode. As such, a separate table may not necessarily be needed, but an equivalent exposure time-gain product in hjr mode may be needed to compare to the exposure time-gain product in normal mode. When operating in hjr mode, parameters are changed to reduce the difference between the exposure-time-gain-product in hjr mode and the exposure time gain product in normal model. As long as an image sensor in a camera system is able to be above a minimum average light level, the difference may be reduced. In any region in hjr mode, where an image sensor may not be meeting the minimum average amount of light level, it may not be possible to maintain the same exposure time-gain product in hjr mode as in normal mode. Operation of a camera in normal mode may be in response to a sensed light level being above a threshold. The operation of a camera in the hjr mode may be selected by the user. The hjr mode may be used in response to a sensed light level being lower than the threshold.

BRIEF DESCRIPTION OF DRAWINGS

Various configurations are illustrated by way of example, and not by way of limitation, in the accompanying drawings.

A flowchart illustrating how to operate a camera system in normal mode and hand jitter reduction mode is in FIG. 7.

DETAILED DESCRIPTION

The word "exemplary" is used herein to mean "serving as an example, instance, or illustration." Any configuration, scheme, design or calibration described herein as "exemplary" is not necessarily to be construed as preferred or advantageous over other configurations, schemes, designs, or calibrations. In general, described herein are techniques which reduce blurriness in digital pictures as a result of hand jitter and/or lower lighting conditions than normal. Also described are techniques to calibrate cameras which are operable in normal mode and hand jitter reduction mode.

In conventional camera devices, when a user takes a snapshot (currently done by pressing a button), mostly only one frame is used to generate a picture. Methods which employ using more than one frame to generate a picture often are not successful because they yield poor results. With conventional camera devices, the picture may be blurry due to movements produced by the user's own hand movements, these hand movements are known as hand jitter. Conventional camera devices also are challenged by the amount of time required to expose a picture. Under low lighting conditions, the exposure time is typically increased. Increasing the exposure time increases the amount of noise that a user may see due to low lighting conditions as well as increases the probability that hand jitter will produce a blurry picture. Currently, camera devices may contain small gyroscopes to compensate for the hand jitter produced by the user. However, there are many challenges faced when placing gyroscopes on mobile units. Even when these challenges are overcome, the digital hand jitter reduction techniques may be used in combination with devices that have gyroscopes. Current camera devices may also scale the gain under low lighting conditions. Unfortunately, simply increasing the gain amplifies the noise present as a result of the low light level. The result is often a picture of poor quality. Similarly, digital compensation for hand jitter does not always provide adequate results. However, with the techniques disclosed throughout this disclosure, it has been possible to reduce hand jitter, as well as reduce noise under lower light conditions.

Figure 1:
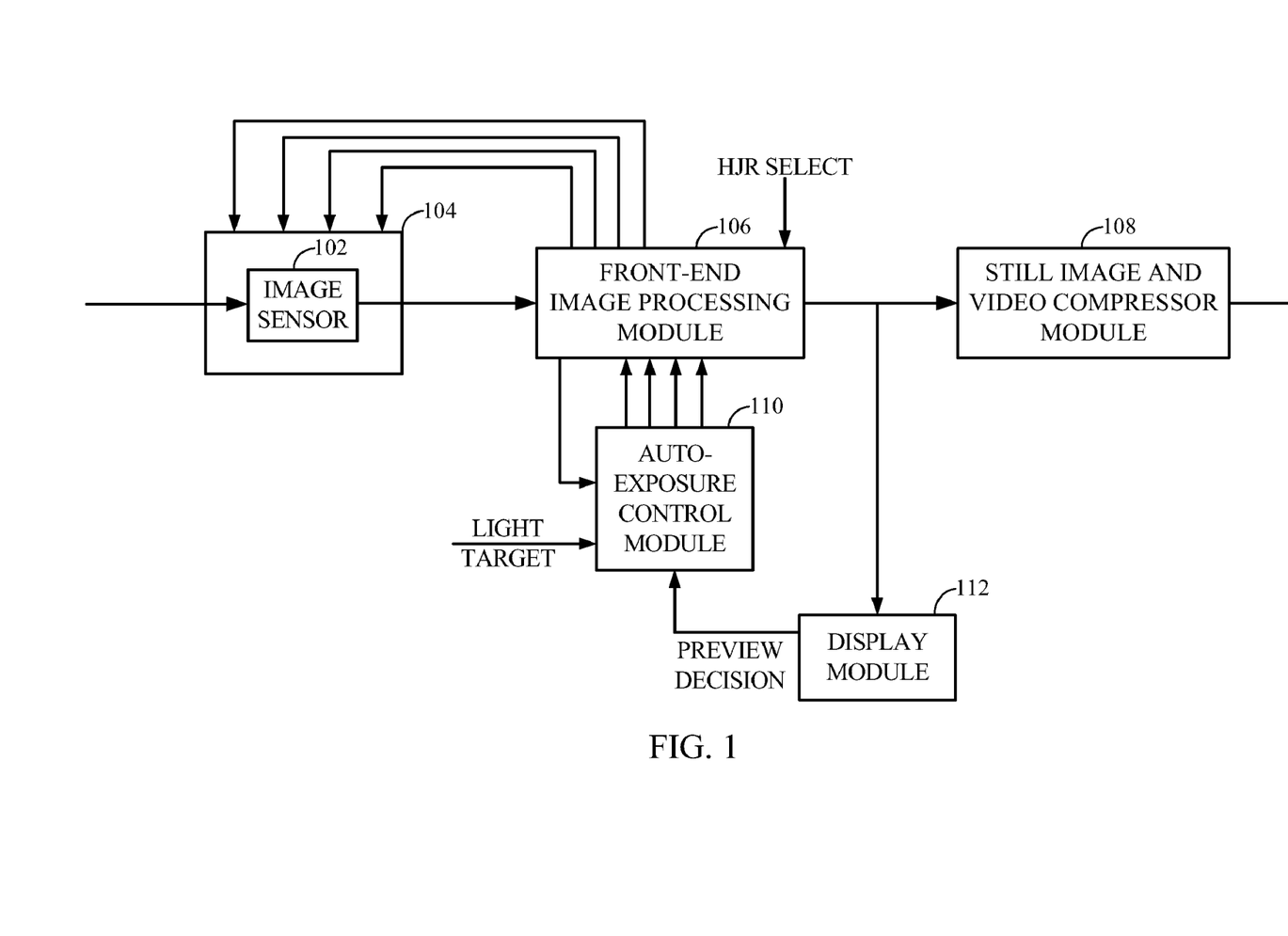
FIG. 1 is a block diagram illustrating one configuration of a digital imaging process.

FIG. 1 is a block diagram illustrating a digital imaging process suitable for a camera device integrated into a mobile unit. The mobile unit may be a wireless phone, personal digital assistant (PDA), laptop computer, or any other mobile wireless device. A lens (not shown) may be used to focus an image onto an image sensor 102, in an image sensor module 104. In one configuration, image sensor module 104 may have a memory for storing gain and exposure parameters. Image sensor module 104 may also have a control driver for modifying gain and auto-exposure parameters. In another configuration, image sensor module 104 may be coupled to an integrated circuit, such as a Mobile Station Modem (MSM™), or other module which has a memory and/or control driver for storing and modifying gain and auto-exposure parameters. The image sensor 102 may be a charge-coupled device (CCD), a complimentary metal oxide semiconductor (CMOS) image sensor, or any other suitable image sensor. In at least one configuration of the image sensor 102, an array of semiconductors may be used to capture light at different pixels of the image. A color filter array (CFA) (not shown) positioned in front of the image sensor 102 may be used to pass a single color (i.e., red, green or blue) to each semiconductor. The most common CFAs are RGB and CMYG patterns. The image sensor module 104 may drive or control image sensor 102 to modify the gain, and or exposure time.

Before a user presses the button to take a snapshot and produce a digital picture, a preview mode, may capture a series of frames produced by the image sensor 102. The whole frame or a sub-part of the frame is referred to as an image or interchangeably a picture. For illustrative purposes, it is convenient to discuss the images being processed as a series of frames. Although it should be recognized that not the entire frame need be processed when using a front-end image processing module 106. In addition, the sequence of frames is also known as a stream. The stream may be provided to a front-end image processing module 106 where they are de-mosaiced in order to obtain full RGB resolution as an input to the still image and video compressor 108. As the stream passes through the front-end image processing module 106, in the preview mode, statistics may be collected on frames that aid with the production of the digital picture. These statistics may be, but are not limited to, exposure metrics, white balance metrics, and focus metrics.

The front-end image processing module 106 may feed various signals, which help control the image sensor 102, back into the image sensor module 104. The still image and video compressor 108 may use JPEG compression, or any other suitable compression algorithm. An auto-exposure control module 110 may receive a value proportional to the light level being processed by the front-end image processing module 106, and compare it to a stored light target, in order to aid in at least one of the functions of the front-end image processing module 106. Images that are processed through the modules in front-end image processing module 106 are part of digital frames. The stream may also be sent to a view finder which may be located in display module 112. In the preview mode, a preview decision from the display module 112 may be used in the control of the auto-exposure.

The preview mode in a mobile unit having a digital camera may be used in either a normal mode or a hand jitter reduction (hjr) mode. The user may select the hjr mode (shown as hjr select in FIG. 1) through a user-interface either through a menu or manually. Auto-exposure parameters such as gain, auto-exposure time, frame rate and number of frames to process, may be determined within moments after the user presses the button to take a snapshot and produce a digital picture. The collected statistics may be used to determine auto-exposure parameters used during the snapshot in both the normal mode and the hjr mode. Hence, after the user presses the button, the image processing may be different between hjr mode and normal mode. Before the user presses the button the preview mode is processing images as it would in normal mode, even if the hjr mode has been selected.

Figure 2:
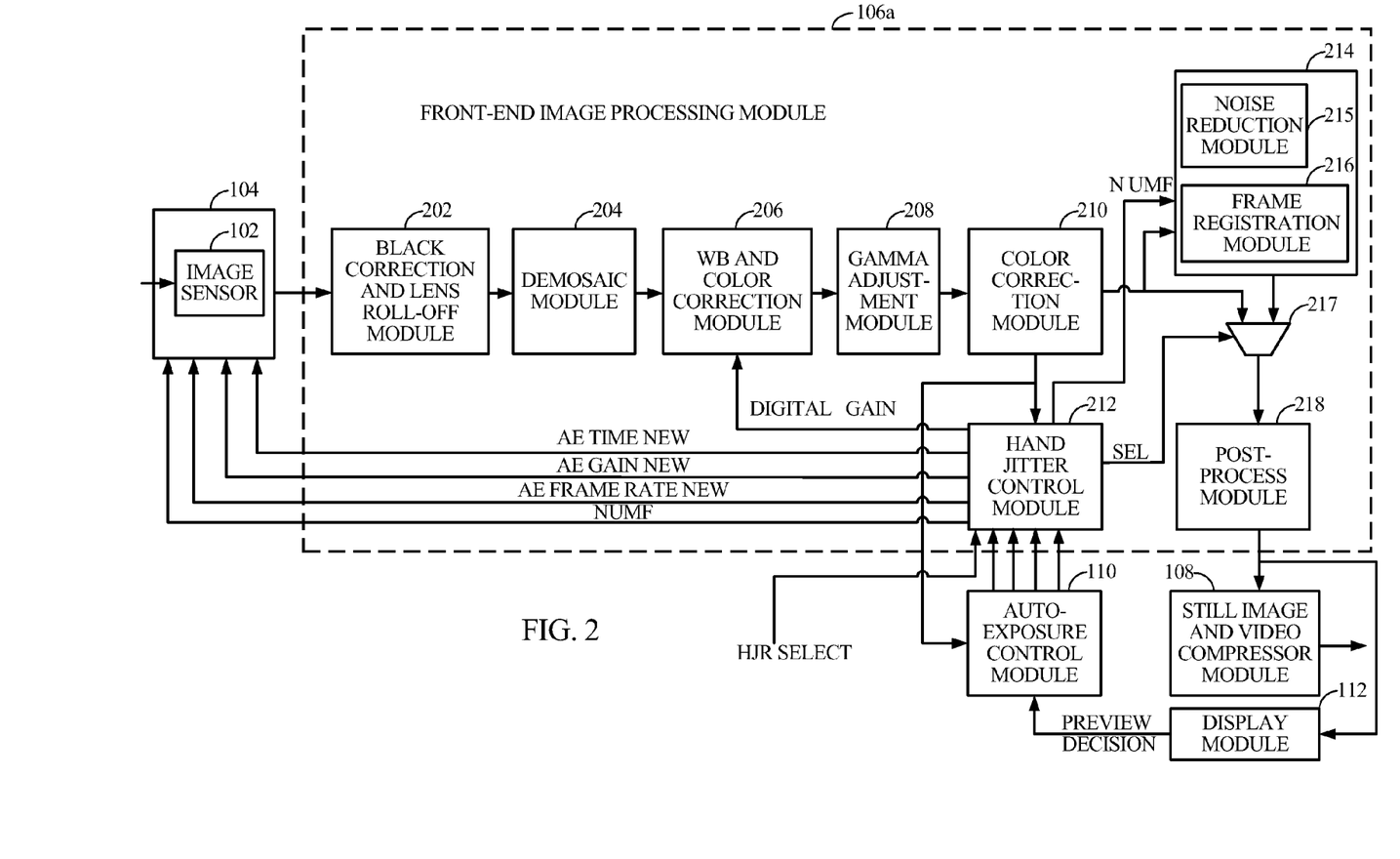
FIG. 2 is a block diagram illustrating the functionality of one configuration of one front end image processing module in a digital image processing system.

FIG. 2 is a block diagram illustrating the functionality of one configuration of one front end image processing module 106a in a digital image processing system. The front-end image processing module 106a may be used to compensate for differences between the responses of human visual system and sensor signals generated by the image sensor 102. These differences may be corrected using various processing techniques including, by way of example, black correction and lens rolloff 202, de-mosaic module 204, white balance and color correction 206, gamma adjustment 208, and color conversion 210. These processes are represented in FIG. 2 as separate processing modules, but alternatively may be performed using a shared hardware or software platform. Moreover, these modules may include multiple image processing modules that perform the same function, thereby allowing the function to be performed in parallel on different images.

After the color conversion module processes a frame, three color image-components (Y, Cb, and Cr) may be may be sent to hand jitter control module 212. The various parameters from the auto-exposure control module may be fed into hand jitter control module 212. Hand jitter control module 212 may serve multiple purposes. Hand jitter control module 212, may determine the image processing that takes place after the snapshot. Hand jitter control module 212 may detect the value of hjr select, and determine if hand jitter reduction (hjr) needs to be performed. Even though the user has selected hjr mode, hand jitter control module 212 may determine that image processing as is done in normal mode may take place. Hand jitter control module 212 may determine that image processing in hjr mode take place. Generating a digital picture image processing in hjr mode may include capturing a single frame or multiple frames. If hand jitter control module 212 determines that multiple frames will be captured, after passing through hjr control module, the frames may be sent to noise reduction/frame registration module 214, along with a parameter which indicates how many frames may be processed by noise reduction/frame registration module 214. If a single frame is to be processed, noise reduction may take place on the single frame through the use of a noise reduction module 215. Noise reduction module may be a bayer filter, or other similar filter. If multiple frames are to be processed, noise reduction/frame registration module 214 may buffer the number of frames, numf, specified by hand jitter control module 212, and perform frame registration on them. Depending on how many frames and the light level, the purpose of the multiple frame registration may serve the purpose of noise reduction and/or blur reduction. Multiple frame registration may be done by a frame registration module 216.

If hand jitter control module 212 determines that image processing takes place as in normal mode, noise reduction/frame registration module 214 may not be used, and the output from color correction module 210, for example, may be used, even though the user selected hjr mode. Depending on what image processing (the one in normal node or the one in hjr mode) is determined by hand jitter control module 212, a signal (sel) may be used to select which multiplexer 217 output to send to post-process module 218. The output of post-process module 218 may be sent to still and image video compressor 108 and/or display module 112.

In addition to outputting a select signal (sel) and the number of frames to use for noise reduction and/or frame registration, hand jitter control module 212 may also output other parameters: new auto-exposure frame rate (ae fr_new), new auto-exposure gain (ae gain new), new auto-exposure time (ae time_new), and the number of frames to be processed (numf). These parameters may be sent to image sensor module 104 to control image sensor 102. A digital gain may also be output by hand jitter control module 212 and may be applied at any module after the image sensor module 104. As an example, the digital gain may be applied during the white-balance/color correction module 206.

Those ordinarily skilled in the art will recognize that while pixels are normally described, sub-pixels, or multiple pixels may also be used as inputs into front-end image processing module 106a. Furthermore, a sub-set of these image-components or other forms: RGB, and spatial-frequency transformed pixels, may also be sent to a hand jitter control module, such as hand jitter control module 212. As such, another configuration which captures the functionality of a front end image processing module in a digital image processing system is illustrated in FIG. 3.

Figure 3:
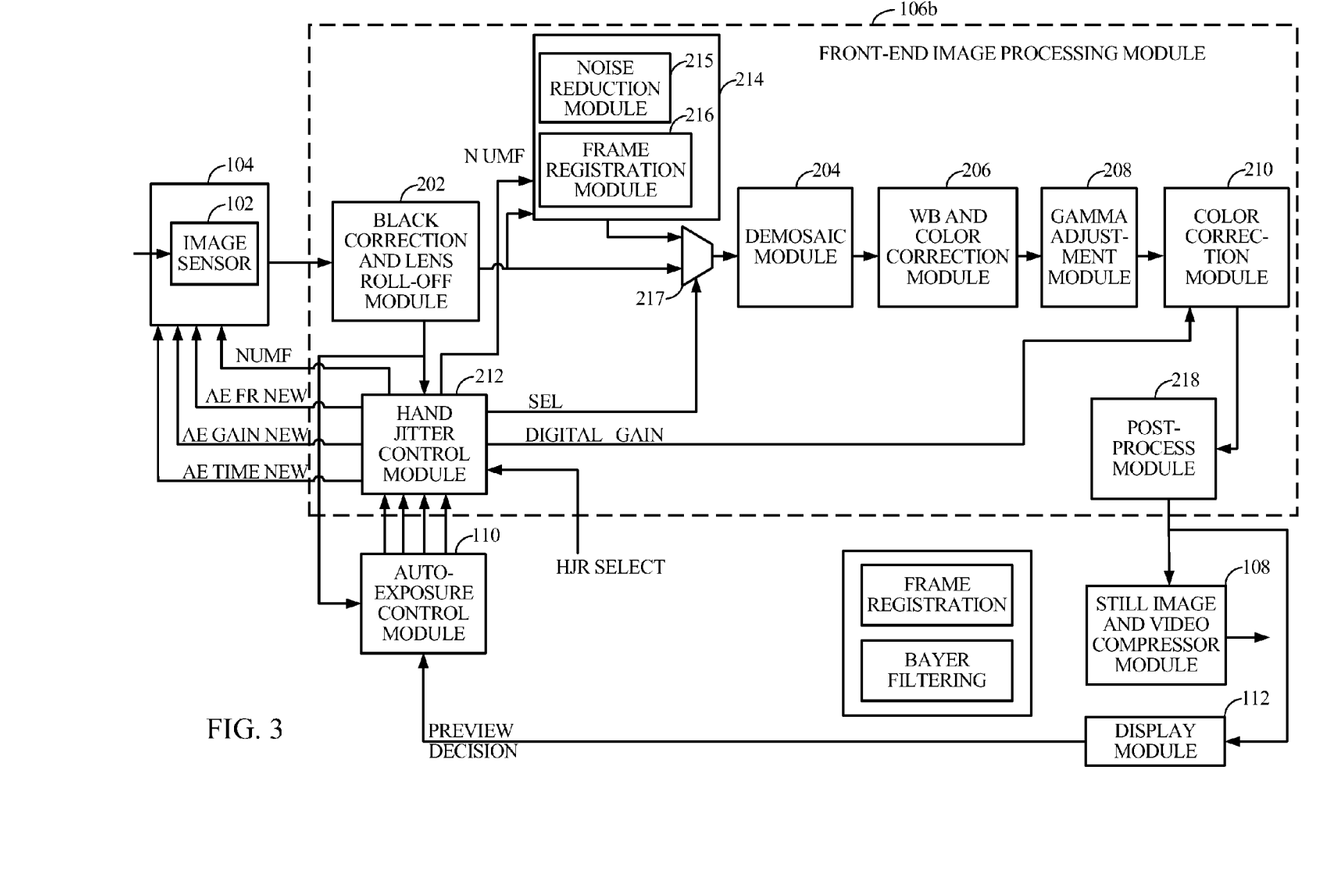
FIG. 3 is a block diagram illustrating the functionality of another configuration of a front end image processing module in a digital image processing system.

In FIG. 3 hand jitter control module 212, noise reduction/frame registration module 214, and multiplexer 217 have been moved and inserted in-between black correction and lens roll-off module 202, and demosaic module 204. This configuration embedded in front end image processing module 106b, shows that hand jitter control module 212 may operate on R, G, and B image components, not just Y, Cb, and Cr. In general, hand jitter control module 212 may operate in any subsequent module after the light is captured by image sensor 102, and preceding any display module 112 or still image and video compressor module 108.

The normal mode and hand jitter reduction mode may be calibrated by creating at least one auto-exposure time-gain table. An auto-exposure time-gain table may have an exposure time column and a gain column. An entry in the exposure-time column and an entry in the gain column may be multiplied to produce an exposure-time gain product. Each row entry or index into an auto-exposure time-gain table may represent a light level value, that is, each light level may be mapped to an auto-exposure index into the auto-exposure time-gain table. The auto-exposure time-gain table(s) may have various regions of operation, such as those designated in FIG. 4A, FIG. 4B, FIG. 5A, and FIG. 5B. In all four figures (FIG. 4A, FIG. 4B, FIG. 5A, and FIG. 5B) there are four possible light level regions, R1, R2, R3, and R4 illustrated on the abscissa-axis. Separation of regions may be governed by different boundaries, boundary_a, boundary_b, and boundary_c. The light level shown on the far left of the abscissa-axis starts out high and then decreases to low, as shown on the far right of the abscissa-axis. The exposure time-gain product, i.e., (exposure time)*(gain), in each region should aim to be non-decreasing. As such, decreases in either exposure time or gain may lead to increases of gain or exposure time. The auto-exposure time-gain table(s) may be calibrated depending on the type of sensor(s), settings and/or properties of the camera. The table(s) may also be calibrated using more than one frame rate. In addition, the table(s) may be stored in a memory on an integrated circuit that does the main image processing, such as front-end image processing module 106 and still image and video compressor module 108. The table(s) may also be stored in a memory not on an integrated circuit that does the main image processing. In both cases, whether on the same integrated circuit as the main image processing or not, the tables may be coupled to image sensor module 104.

Figure 4A:
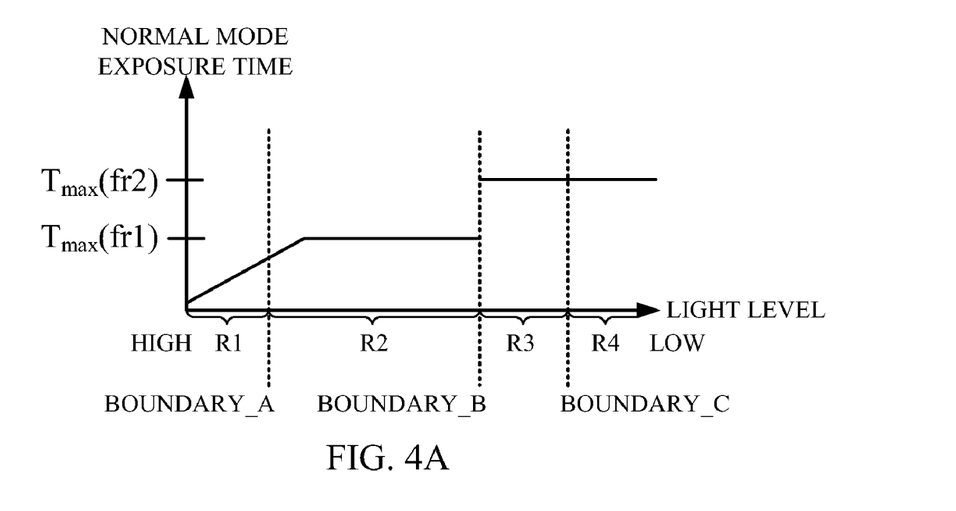
FIG. 4A is a graph illustrating exposure time versus light level for normal mode.
Figure 4B:
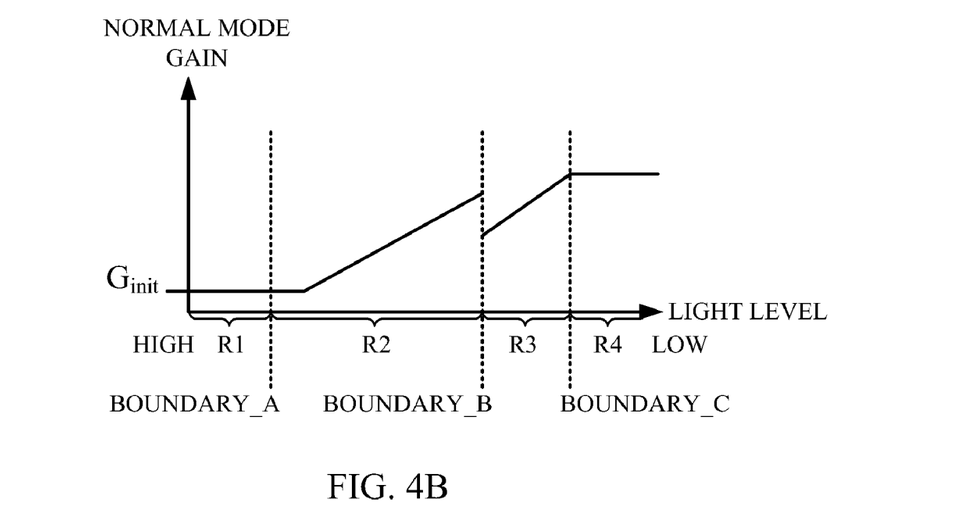
FIG. 4B is a graph illustrating gain versus light level for normal mode.

FIG. 4A is a graph illustrating exposure time versus (detected) light level for normal mode, and FIG. 4B is a graph illustrating gain versus (detected) light level for normal mode. Because the light level is high in region R1, the exposure time is short, i.e., a low value. Similarly, in region R1, the gain is at a nominal value, i.e., lower relative to the other regions. For slow moving objects or when the movement of the user's hand is very small, i.e., on the order of 5 ms, there may be minimal advantage to correcting for blur and/or noise reduction in region R1. Even if blur and/or noise reduction were to be performed, it may not be visible to the user's eye. Hence, boundary_a lies around the point where the blur and/or noise reduction is visible to the user, i.e., the combination of exposure time and gain that allows the user to visibly see a blur and/or noise reduction. Boundary_a which separates region R1 and region R2, may vary from user to user and/or camera to camera. Boundary_a may also be considered the threshold between image processing in normal mode and image processing in hjr mode.

In region R1 and R2 the camera may operate at one frame rate, e.g. fr1. As shown in FIG. 4A, as the light level decreases, in region R1, the exposure time increases. The exposure time increases in region R1. The exposure time may continue to increase in region R2 until the exposure time reaches a maximum value for frame rate1, fr1. At this light level, where the exposure time is first at a maximum value for frame rate1, fr1, the gain (shown in FIG. 4B) may start to increase. The gain may continue to increase until a pre-determined value set during calibration is at a point where there is an acceptable level of noise. If the gain increased to the maximum, the level of noise may not be acceptable for that given exposure time. For normal mode, boundary_b may be designated as the point where the exposure time at frame rate1, fr1, is at a maximum and the gain is at a pre-determined value where there is an acceptable level of noise. Boundary_b which separates region R2 and region R3, may vary from camera to camera.

It is desirable to make the transition from one region to another as continuous as possible. Thus, the exposure time-gain product at the far right in region R2 may be near or the same as the exposure time-gain product at the far left in region R3. Since the exposure time is at a maximum, as shown at the far right in region R2, the frame rate may be lowered at boundary_b. The lowering of the frame rate, i.e., changing the frame rate from fr1 to fr2, allows an increase in the exposure time. The exposure time may reach the maximum (as shown in FIG. 4B in region R3) for the new frame rate, frame rate2, fr2. In order to preserve the continuity of the exposure time-gain product between region R2 and region R3, the gain in region R3 is lowered to offset the increase in exposure time. The gain may increase until it reaches a maximum. Although, a digital gain may be applied, the gain used in normal mode is typically analog. Boundary_c, in normal mode, is the point where the analog gain reaches a maximum. At boundary_c, in normal mode the corresponding light level may be stored as a light target to be checked in hand jitter reduction mode.

Hand jitter reduction (hjr) mode may be calibrated by creating another auto-exposure time-gain table. Subtraction(s), addition(s), division(s) or multiplication(s) may be performed on the normal mode auto-exposure time-gain table entries to generate an "equivalent" auto-exposure time-gain table desired in the hand jitter reduction mode. The characteristics in the columns (exposure time and gain) of the other auto-exposure time-gain table or "equivalent" auto-exposure time-gain table is illustrated by figures FIG. 5A and FIG. 5B. When taking a snapshot in hjr mode, changes to exposure time and gain, through an equivalent auto-exposure time gain table are relative to normal mode while in preview mode. Preview mode uses the characteristics and auto-exposure parameters of normal mode.

Figure 5A:
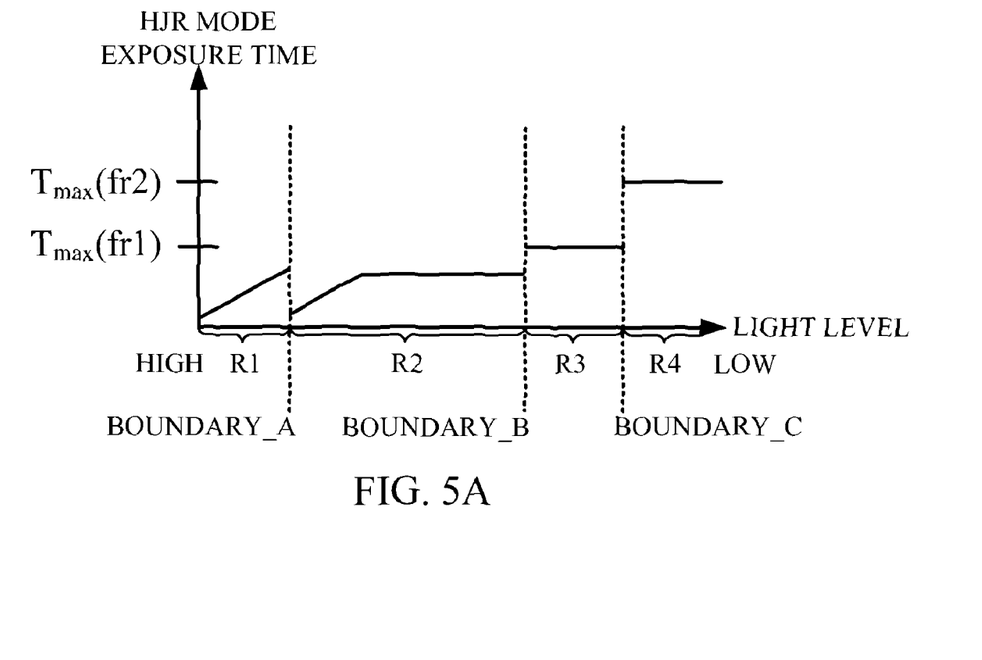
FIG. 5A is a graph illustrating exposure time versus light level for hand jitter reduction mode.
Figure 5B:
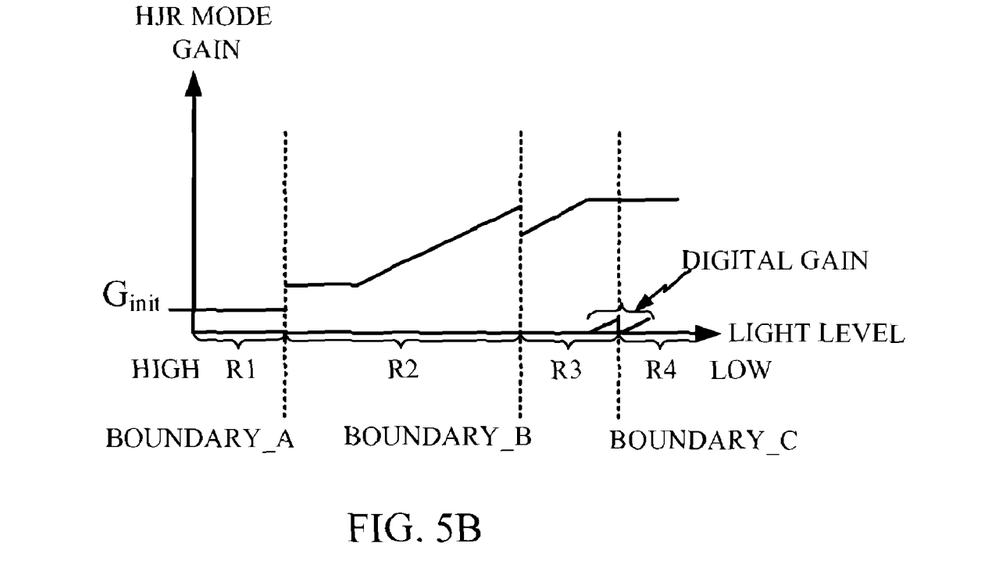
FIG. 5B is a graph illustrating gain versus light level hand jitter reduction mode.

FIG. 5A is a graph illustrating exposure time versus (detected) light level for hand jitter reduction mode. FIG. 5B is a graph illustrating gain versus (detected) light level hand jitter reduction mode. In the hand jitter reduction (hjr) mode, the goal is to aim to maintain the same exposure time-gain product as in normal mode. As such, [exposure time in the hjr mode]*[gain in the hjr mode] should aim to be the same as [exposure time in the normal mode]*[gain in the normal mode]. As mentioned previously, there is minimal advantage in trying to reduce hand jitter in region R1 since it may not be visible to the human eye. In region R1, the gain and exposure time in hjr mode may be the same as in normal mode. Hence, image processing that takes place in normal mode, in region R1, may also take place in region R1 while in hjr mode. However, in regions R2, R3, and R4, image processing takes place in hjr mode. Image processing to reduce hand jitter takes place with modified auto-exposure parameters, while image processing that doesn't require the reduction of hand jitter takes place with unmodified auto-exposure parameters.

Longer exposure time increases the probability that slight movements produced by the hand may lead to blurriness. Thus, once the eye can detect a blur and/or noise reduction, in region R2, the exposure time should be decreased. Hence, the exposure time in region R2 is reduced (as shown in FIG. 5A) to lower the probability that hand jitter will result in blurriness. To counteract the decrease in the exposure time, the gain in region R2 is increased (as shown in FIG. 5B). Notice that the same shape in region R2, of the exposure time and gain as in the normal mode is preserved in the hjr mode. One of the differences between the normal mode and the hjr mode in region R2, is that the exposure time and gain from the normal mode are offset from the hjr mode. In hjr mode, the exposure time is at a lower offset than in normal mode, and the gain is at a higher offset than in normal mode. However, the exposure time-gain product is equivalent between both normal mode and hjr mode in region.

As mentioned previously, in either normal mode or hjr mode, a series of frames may be previewed. Preview mode uses the characteristics and (unmodified) auto-exposure parameters of normal mode. In hjr mode, the equivalent auto-exposure time and gain table is relative to the normal mode while in preview mode. Thus, when increasing or decreasing the exposure time, the gain, or the frame rate it is relative to the value in preview mode. In the hjr mode, boundary_b may be determined by checking when the exposure time-gain product reaches the same value as the exposure time-gain product as in the normal mode. In hjr mode, if the light level is in region R3, the frame rate may be increased by an amount greater than frame rate fr2. This may happen because in preview mode, in region R3, the frame rate is fr2 (a rate lower than fr1). For example, if frame rate fr1 is 30 frames per second (fps), and frame rate fr2 is 15 fps, then in hjr mode the frame rate of 15 fps may be increased by some amount L, up to frame rate fr1. In this example, L is 15 fps. Hence, in hjr mode, increasing the frame rate from 15 fps to 30 fps, for example, allows the exposure time to be maximized in region R3 to the value that it was in region R2 for the normal mode. The increase in exposure time in region R3, may lead to a decrease in gain in region R3. If an analog gain is used throughout regions R1, R2 and R3, because of the increased gain offset (at the far left of region R2) in the hjr mode, the analog gain in region R3 may saturate, i.e., reach a maximum (as seen in the far right of region R3) prior to boundary_c. To operate beyond the maximum analog gain, a digital gain may be added to the analog gain. The digital gain is illustrated at the bottom of FIG. 5B in between region R3 and region R4.

The light level, in normal mode at boundary_c, may be stored as a predetermined light target to be checked in hjr mode. In hjr mode, if the light level is below that of the stored light target, it may be that there is not enough light for an image sensor 102 to produce a minimum average light level for an image sensor 102. A minimum average light level may be determined by adding the light value (luma and/or chrominance) at each pixel and dividing by the total number of pixels. Another way to compute the minimum average light level for an image sensor 102 is to discard in the computation all pixels which are below a certain threshold. For example, pixels below the value 10 are not used, and the remaining pixels (above the certain threshold) are used to compute the minimum average light level. Typically, luma light values are used, although chrominance values may also be used. For illustrative purposes the luma value is discussed. In the hjr mode, if the luma value is below the predetermined luma (light) target, the light (luma) level will be in region R4.

If it has been determined that the light level is below the luma target in hjr mode, the frame rate, which in preview mode was fr2, does not need to be changed. The exposure time, however, may be adjusted because of the reduced amount of light and may be increased. The exposure time may be increased to the maximum allowable for frame rate fr2. To counteract the increase in exposure time, the digital gain is decreased at boundary_c, and may continue to increase in region R4.

Throughout regions R1, R2, and R3, the exposure-time-gain product between normal mode and hjr mode is aimed to be the same. That is, the difference should be reduced to make the difference between the two as close as possible to zero. In region R4, an image sensor 102 may not be meeting the minimum average amount of light level. Hence, a digital gain may be applied to increase the gain level in region R4.

Figure 6:
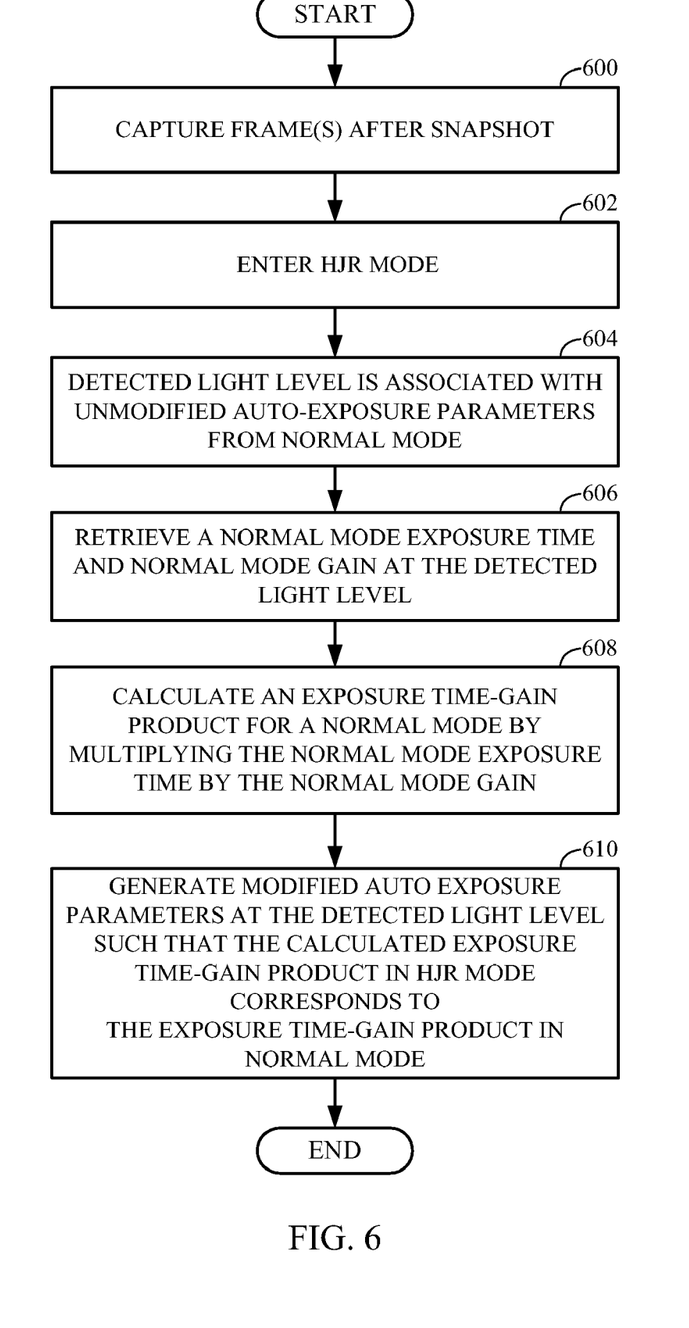
FIG. 6 is a flowchart illustrating a method of generating modified auto-exposure parameters.

FIG. 6 is a flowchart illustrating a method of generating modified auto-exposure parameters. As illustrated in the flowchart, frames may be captured after a snapshot 600. The last frames processed in preview mode may be stored in a memory. Capturing means that retrieval of frames from the memory may be used to produce a digital picture. At current frame rates and memory storage capabilities on a mobile unit, there may be less than ten frames in a memory after a snapshot. Although, not every frame in the memory may be needed when producing a digital picture. Typically, up to three captured frames that may be used in producing a digital picture. In order to generate modified auto-exposure parameters after a snapshot the camera may be in hjr mode. Hence in another embodiment, enter hjr mode 602 may precede capture frames after a snapshot. Although in FIG. 6 enter hjr mode 602 is illustrated subsequent to capture frames after a snapshot. Once in hjr mode, the detected light level is associated with unmodified auto-exposure parameters from normal mode 604. The unmodified gain and exposure time may be retrieved from memory at the detected light level 606. Calculation of the exposure time-gain product in normal mode may be done by multiplying the exposure time and gain from normal mode 608. The exposure time-gain product in hjr mode, may be calculated by modifying the auto-exposure parameters from normal mode. These auto-exposure parameters may be gain, exposure time, and/or frame rate. Auto exposure parameters may be modified to reduce the difference between the exposure time-gain product in hjr mode and the exposure time-gain product in normal mode 610. Thus, there is an exposure time-gain product in hjr mode that corresponds to an exposure time-gain product in normal mode. Ideally, the correspondence should be the same. However, because of potential calculation precision differences when multiplying and potential detected light levels being slightly different between hjr mode and normal mode, the correspondence may not be the same. It is sufficient, that the difference between the exposure time-gain product in hjr mode and normal mode be reduced as much as possible. In addition, in a region in hjr mode, such as region R4 above, an image sensor 102 may not be meeting the minimum average amount of light level. Thus, it may not be possible to maintain the same exposure time-gain product in hjr mode as in normal mode.

Figure 7:
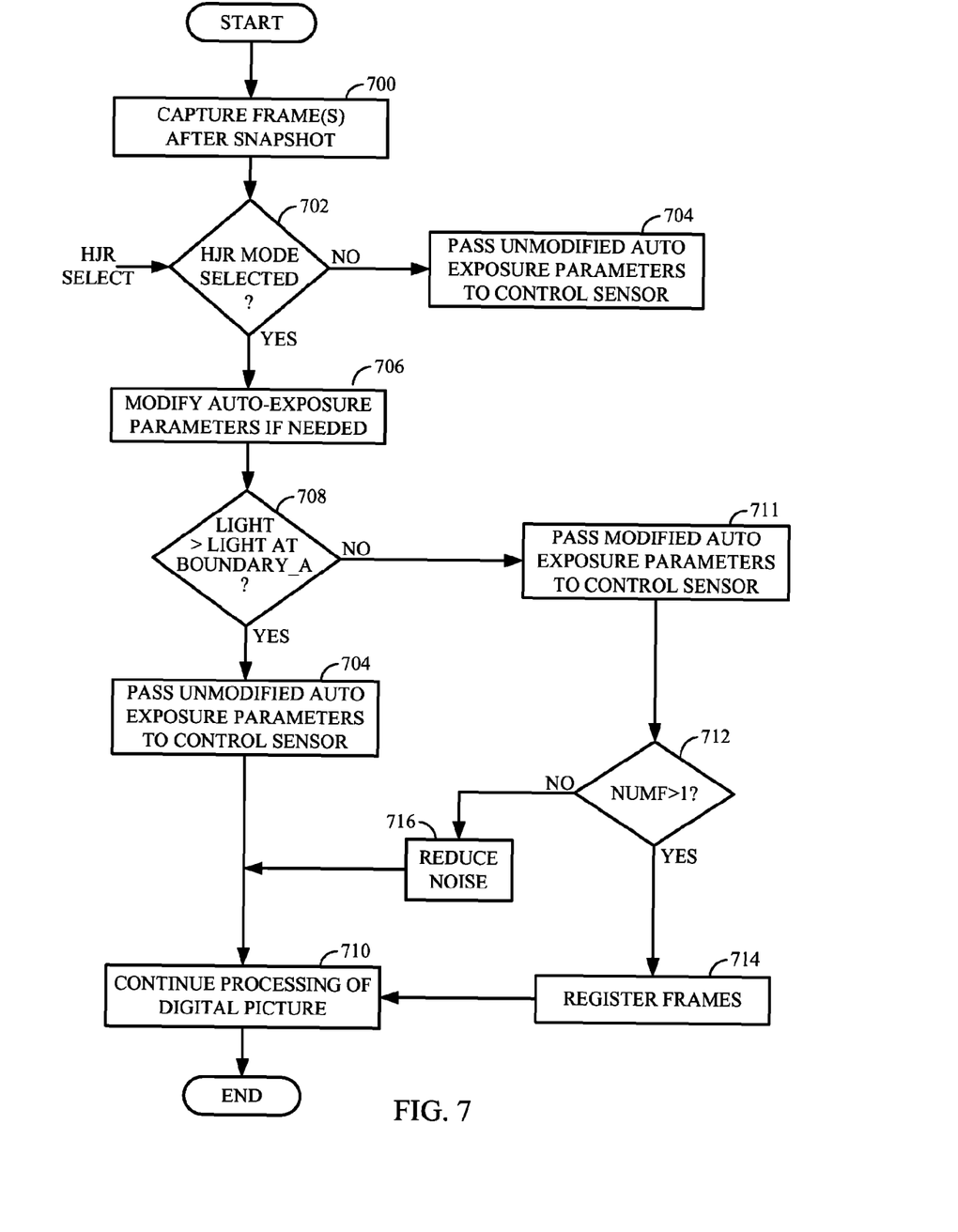

A flowchart illustrating how to operate a camera system in normal mode and hand jitter reduction mode is in FIG. 7. In order to generate an image, the first act is to capture frame(s) after a snapshot 700. Once captured, a check is performed to see if hjr mode has been selected. If hjr has not been selected, unmodified auto-exposure parameters may be passed to control the image sensor 704. These parameters may be, auto-exposure frame rate (ae fr), auto-exposure time (ae time), auto-exposure gain (ae gain), measured luma, and luma target. If hjr mode is selected, modification of auto-exposure parameters takes place if needed 706. In a next act, a check is performed to see if the light level is in region R1 708, i.e., in a region where the same (or nearly same) parameters are present in normal mode. If the light level is greater than the light level at boundary_a (i.e., the light level is in region R1), then unmodified auto-exposure parameters may be passed to control the image sensor 704. Even though hjr mode is selected, image processing in normal mode may take place. In a subsequent act, after the unmodified auto-exposure parameters are passed to control the image sensor, processing of the digital picture may continue 710. If the light level is below the light level at boundary_a (as performed by the check in decision block 708), then modified auto-exposure parameters, along with the number of frames (numf), and a digital gain may be used to control the image sensor 711. The modified auto-exposure parameters may be, a new auto-exposure frame rate (ae fr_new), a new auto-exposure time (ae time_new), a new auto-exposure gain (ae gain new), measured luma, and luma target. The number of frames to process to generate a digital picture, numf, may be checked 712. If numf is greater than one, multiple frames may be registered 714. Frame registration may compensate for motions (horizontal, vertical, or angular) between frames. It may increase the intensity of the resulting image after frame registration. If numf is greater than two, frame registration may also aid in noise reduction. If numf is one and hjr has been selected, reduction of noise 716 may also take place. One possible way to reduce noise in one frame is to apply bayer filtering to the image components. After noise reduction takes place, processing of the digital picture may continue 710. It should be noted that blocks 702, 704, 706, and 711 in FIG. 7 may be found in hand jitter control module 212.

Figure 8:
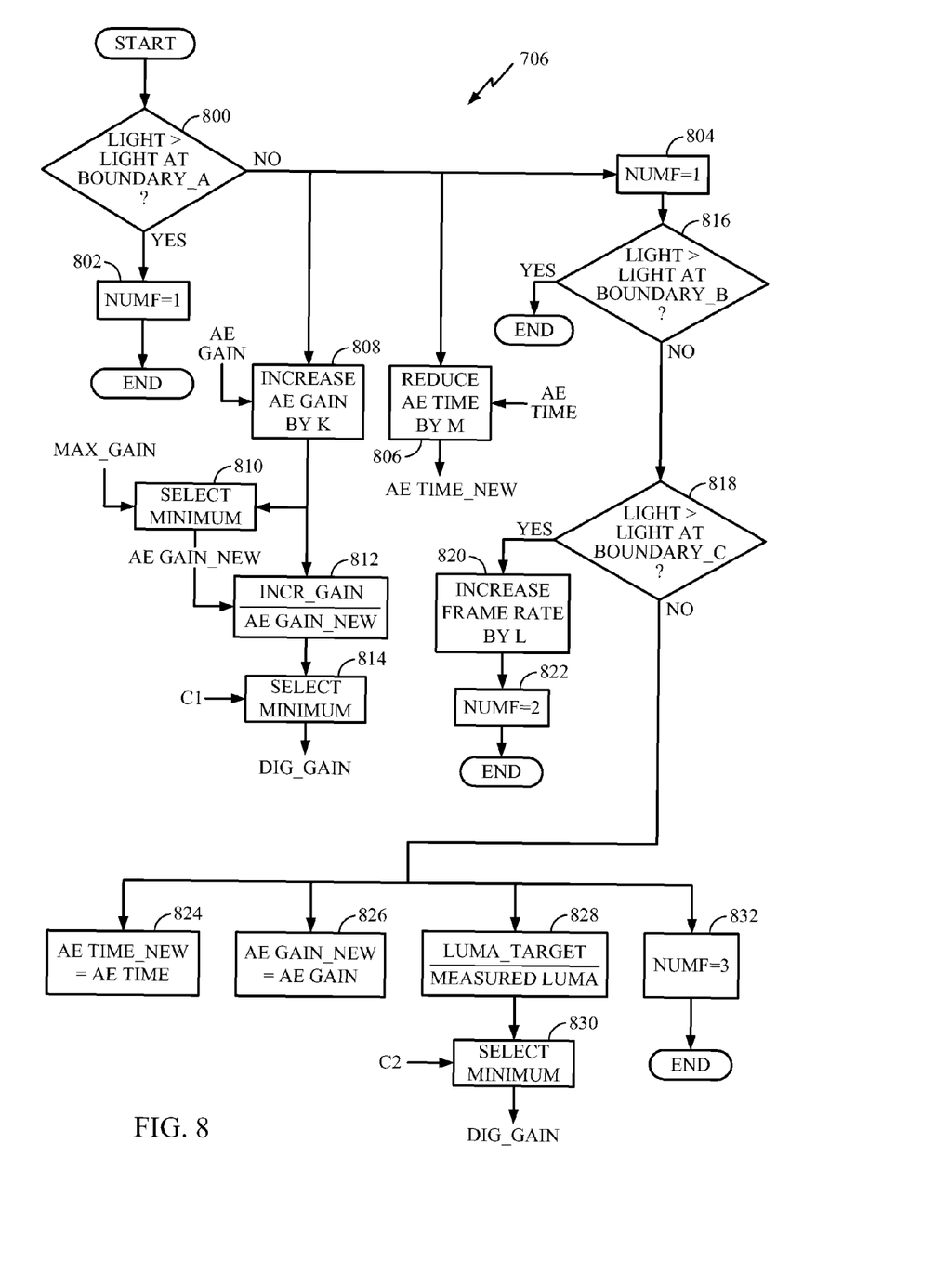
FIG. 8 is a flowchart illustrating the modification of auto-exposure parameters in a camera system in hand jitter reduction mode.

FIG. 8 is a flowchart illustrating the modification of auto-exposure parameters in a camera system in hand jitter reduction mode. Even though selection of hjr mode may have taken place, image processing in normal mode may still be used. A check is performed by decision block 800, if the light level is greater than the light level at boundary_a, the number of frames to process to generate a digital picture, numf, is set to one 802, and image processing in normal is used. In this case, there was no modification of the auto-exposure parameters. If the light level is less than the light level at boundary_a, then image processing in hjr mode may be used. The number of frames to process to generate a digital picture, numf, is set to one 804. As illustrated in FIG. 5A and FIG. 5B, the exposure time may be reduced by some amount M 806. There is a wide range that M may be, however, values at or around 50% have shown good results. The gain may also increase by some amount K 808. Since the exposure time-gain product in hjr more aims to be maintain the exposure-time-gain-product in normal mode, values at or around 200% for K have shown to reduce hand jitter.

Selection of the minimum between the increased gain by K and the max (analog) gain 810, may be used if the increased gain exceeds the maximum analog gain of the image sensor. It may also be used in a configuration where a digital gain is used in a region like R2. The ratio of the increased gain by K and the new analog gain 812 (ae_gain new) may be compared with a constant C1. C1 is related to the maximum analog gain of the sensor, and a typical value may be one. The minimum between C1 and the ratio of the increased gain by K and the new analog gain is selected 814, and at the minimum value a digital gain may be applied.

A decision block 816 compares if the light level is greater than the light level at boundary_b. If the light level is greater than the light level at boundary_b, then modification of auto-exposure parameters if needed 706 ends. If the light level is less than at boundary_b, a decision block 818 compares if the light level is greater than the light level at boundary_c. If the light level is greater than at boundary_c, then the frame rate may increase by some amount L 820. As mentioned above, in region R3, in hjr mode the frame rate fr2 may be increased up to and including frame rate fr1. Thus, L may be an amount that adjusts the frame rate closer to and including frame rate fr1. The number of frames to process a digital picture, numf, may be set to two 822. If the light level is less than the light level at boundary_c, the new exposure time 824 and new gain 826 in hjr mode may be the same as that used in normal mode. The ratio of the luma_target with the measured luma (i.e., average luma for the image sensor) 828 may be compared with a constant C2. The minimum selection 830 between the constant C2 and the ratio of the luma_target with the measured luma may produce a digital gain. A typical value of two may be used, and may correspond two using the constant instead of the ratio when the measured luma in region R4 has dropped below half of the luma_target. When the image sensor is not meeting the luma target, more frames to process to generate a digital picture, numf, may be used to reduce noise and increase intensity after frame registration. A minimum value of three frames, for numf, 832 has been found to suffice in this case.

A number of different configurations and techniques have been described. The techniques may improve removing blurriness from images with longer exposure times. The techniques and configurations may also aid in the reduction of hand jitter for practically any digital device that takes pictures. The techniques and configurations may be implemented in hardware, software, firmware, or any combination thereof. If implemented in software, the techniques and configurations may be directed to a computer-readable medium comprising computer-readable program code (also may be called computer-code), that when executed in a device that takes pictures, performs one or more of the methods mentioned above.

The computer-readable program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components, such as multiplication of an exposure time and gain, to generate an exposure time-gain product. The exposure time-gain product (s) disclosed may be implemented in one or more microprocessors, one or more application specific integrated circuits (ASICs), and one or more field programmable gate arrays (FPGAs), or some other hardware-software combination. These techniques and configurations are within the scope of the following claims.

The invention claimed is:

1. A device comprising normal mode auto-exposure parameters, the device comprising:
   means for identifying a light level in at least one captured image;
   means for detecting selection of a hand jitter reduction mode; and
   means for dynamically selecting hand jitter mode auto-exposure parameters to image process the at least one captured image, the hand jitter reduction mode auto-exposure parameters having an exposure time-gain product that corresponds to the exposure time-gain product of the normal mode auto-exposure parameters, and the hand jitter mode auto-exposure parameters including a hand jitter reduction mode gain that is greater than a corresponding normal mode gain of the normal mode auto-exposure parameters.

2. The device of claim 1, wherein the hand jitter mode auto-exposure parameters comprise gain and exposure time.

3. The device of claim 1, wherein the hand jitter mode auto-exposure parameters further comprise frame rate.

4. A computer-readable medium storing a set of instructions, wherein the set of instructions when executed by one or more processors performs a method of:
   identifying a light level in at least one captured image;
   detecting selection of a hand jitter reduction mode; and
   dynamically selecting hand jitter mode auto-exposure parameters to image process the at least one captured image, the hand jitter reduction mode auto-exposure parameters having an exposure time-gain product that corresponds to the exposure time-gain product of normal mode modified auto-exposure parameters, and the hand jitter mode auto-exposure parameters including a hand jitter reduction mode gain that is greater than a corresponding normal mode gain of the normal mode auto-exposure parameters.

5. The computer-readable medium of claim 4, wherein the hand jitter mode auto-exposure parameters comprise the hand jitter reduction mode gain and exposure time.

6. The computer-readable medium of claim 4, wherein the hand jitter mode auto-exposure parameters further comprise frame rate.

7. A device that performs image processing comprising a hand jitter reduction mode comprising:
   means for detecting a light level of a captured frame;
   means for selecting single frame noise reduction or multiple frame noise reduction based on the detected light level of only the captured frame; and
   means, responsive to the detected light level, for reducing hand jitter comprising single frame noise reduction when the light level is in a first range and multiple frame noise reduction when the light level is in a second range.

8. The device of claim 7, wherein the reduction of hand jitter includes modified auto-exposure parameters.

9. The device of claim 8, wherein the modified auto-exposure parameters are gain, exposure time, and frame rate.

10. The device of claim 7, wherein the multiple frame noise reduction reduces blurriness through multiple frame registration.

11. The device of claim 7, wherein the single frame noise reduction is bayer filtering.

12. The device of claim 11, wherein the detected light level is mapped to an auto-exposure index.

13. The device of claim 7, wherein image processing in hand jitter reduction mode occurs when the detected light level is above a minimum amount of light level used when removing blur in a digital picture.

14. The device of claim 7, wherein in the first range when the first frame rate reaches maximum the first frame rate is lowered to generate a second frame rate to increase an exposure time.

15. The device of claim 14, wherein a gain is lowered in response to the increased exposure time.

16. The device of claim 7, wherein the second range comprises two ranges, a third range and a fourth range.

17. The device of claim 16, wherein a second boundary between the third range and the fourth range is determined by the light level not meeting a luma target.

18. The device of claim 17, wherein a digital gain is applied in the third range and the fourth range.

19. The device of claim 7, wherein the first range is between boundary_a and boundary_b.

20. The device of claim 7, wherein the second range is beyond boundary_b.

21. An integrated circuit, comprising:
   means for identifying at least one captured image;
   means for detecting selection of hand jitter reduction mode;
   means for identifying a light level associated with the at least one captured image;
   means for mapping the light level to a corresponding gain and exposure time in a normal mode;
   means for computing a first exposure time-gain product from the corresponding gain and exposure time; and means for generating modified auto-exposure parameters in response to the computation of the exposure time-gain product, to reduce hand jitter.

22. The device of claim 21, wherein the means for generating modified auto-exposure parameters in response to the computation of the exposure time-gain product comprises modifying the gain and exposure time.

23. The device of claim 22, wherein the means for generating modified auto-exposure parameters further comprises computation of a second exposure time-gain product.

24. The device of claim 21, wherein the integrated circuit is an MSM™.

25. A method of generating modified auto-exposure parameters comprising:
- capturing at least one frame after a snapshot;
- entering a hand jitter reduction mode;
- associating a detected light level with unmodified auto-exposure parameters;
- retrieving an exposure time and gain from a memory;
- calculating a first exposure time-gain product from the retrieved exposure time and gain; and
- generating modified auto-exposure parameters based on the first exposure time-gain product.

26. The method of claim 25, wherein the generating modified auto-exposure parameters based on the first exposure-time gain product includes multiplying, subtracting, adding, or dividing the retrieved exposure time and gain.

27. The method of claim 25, wherein the modified auto-exposure parameters comprise gain and exposure time.

28. The method of claim 27, wherein the modified auto-exposure parameters further comprise frame rate.

29. An apparatus comprising normal mode auto-exposure parameters, the apparatus comprising:
- an image sensor for detecting a light level in at least one captured image;
- a front-end image processing module coupled to the image sensor, comprising a hand jitter control module for dynamically selecting hand jitter mode auto-exposure parameters to image process the at least one captured image, the hand jitter reduction mode auto-exposure parameters having an exposure time-gain product that corresponds to an exposure time-gain product of normal mode auto-exposure parameters, and hand jitter mode auto-exposure parameters including a hand jitter reduction mode gain that is greater than a corresponding normal mode gain of the normal mode auto-exposure parameters; and
- an auto-exposure control module, for providing the normal mode auto-exposure parameters.

30. The apparatus of claim 29, wherein the hand jitter mode auto-exposure parameters comprise the hand jitter reduction mode gain and exposure time.

31. The apparatus of claim 29, wherein the hand jitter mode auto-exposure parameters further comprise frame rate.

32. The apparatus of claim 29, wherein the normal mode auto-exposure parameters comprise the normal mode gain and exposure time.

33. The apparatus of claim 29, wherein the normal mode auto-exposure parameters further comprise normal mode frame rate.

* * * * *